(12) United States Patent
Hu et al.

(10) Patent No.: US 8,792,483 B2
(45) Date of Patent: Jul. 29, 2014

(54) METHOD AND DEVICE FOR REJECTING REDUNDANTLY RETRANSMITTED SIP MESSAGES

(75) Inventors: Jin Feng Hu, Beijing (CN); Wei Lu, Beijing (CN); Rui Xiong Tian, Beijing (CN); Qing Bo Wang, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1355 days.

(21) Appl. No.: 11/868,990

(22) Filed: Oct. 9, 2007

(65) Prior Publication Data

US 2009/0092131 A1 Apr. 9, 2009

(30) Foreign Application Priority Data

Oct. 11, 2006 (CN) .......................... 2006 1 0142362

(51) Int. Cl.
*H04L 12/66* (2006.01)

(52) U.S. Cl.
USPC .......................................................... 370/356

(58) Field of Classification Search
CPC .... H04L 65/105; H04L 65/80; H04L 65/1006
USPC .......................................................... 370/356
See application file for complete search history.

(56) References Cited

U.S. PATENT DOCUMENTS

| 2008/0127349 A1* | 5/2008 | Ormazabal et al. ............. 726/25 |
| 2008/0134005 A1* | 6/2008 | Izzat et al. ..................... 714/774 |
| 2009/0129342 A1* | 5/2009 | Hwang et al. ................. 370/331 |

* cited by examiner

*Primary Examiner* — Asad Nawaz
*Assistant Examiner* — Syed S Ali
(74) *Attorney, Agent, or Firm* — Cantor Colburn LLP; William A. Kinnaman, Jr.

(57) ABSTRACT

A method for rejecting received SIP messages which are redundantly retransmitted used in a Session Initiation Protocol (SIP) application architecture. In one embodiment, the method comprises: forwarding all the messages transmitted from a SIP application server to a SIP terminal, and dropping all the received SIP messages redundantly retransmitted from the SIP terminal to the SIP application server according to the transmission direction of said SIP messages; and correspondingly replying to the dropped SIP messages according to the message type thereof. The present invention also provides a corresponding retransmission rejection device and a network device comprising the same, and further provides a method and device for rapidly rejecting redundantly retransmitted SIP messages in the case where the memory space is limited. The present invention can be applied to a network device such as a SIP stateless proxy at a front end of a SIP application server cluster.

18 Claims, 7 Drawing Sheets

METHOD AND DEVICE FOR REJECTING REDUNDANTLY RETRANSMITTED SIP MESSAGES

CROSS-REFERENCE TO RELATED APPLICATION

This application claims the benefit of the filing date of Oct. 11, 2006, of the Chinese Patent Application No. CN 200610142362 .X filed on Oct. 11, 2006 under provisions of 35 U.S.C. 119 and the International Convention for the protection of Industrial Property.

FIELD OF THE INVENTION

The present invention generally relates to the Session Initiation Protocol (SIP) technique in the communication field, and in particular, relates to a method and device for rejecting redundantly retransmitted SIP messages at the front end of SIP application servers to reduce impacts of the message retransmission on the SIP application servers.

BACKGROUND OF THE INVENTION

In recent years, the session Initiation Protocol (SIP) technique has been widely considered as a premier choice for locating user, setting session and managing session in IP (Internet Protocol) environments. Moreover, the SIP protocol is also adopted by the 3GPP (3rd Generation Partnership Project) as a call control protocol in an IP multimedia subsystem (IMS), which is a part of the Universal Mobile Telecommunication System (UMTS) protocol (Release 5/6) published by the 3GPP. The SIP is a text based signaling protocol for creating and controlling a multimedia session in which two or more parties attend. A SIP system usually adopts a client/server architecture commonly used in IP networks, defining several types of different servers and user agents to accomplish the call control and transport layers control via requests and responses to/from the servers.

FIG. 1 shows a typical SIP application architecture. As shown in FIG. 1, when service providers deploy applications based on the SIP technique, there exist large SIP application server clusters for hosting applications, and these SIP application servers simultaneously handle concurrent SIP sessions from a large amount of SIP terminals. The workload of these SIP application servers can affect the performance and quality of large-scale telecommunication services. In front of these SIP application server clusters, there is a SIP stateless proxy between the SIP terminals and the SIP application servers for receiving, pre-processing and forwarding SIP messages.

According to the SIP, SIP User Agents (UAs) are end system units of a call, which include a User Agent Client (UAC) and a User Agent Server (UAS). A SIP Transaction includes a procedure of the UAC sending requests to the UAS and the UAS returning all the responses to the UAC. In the discussion of the specification, the transaction can be categorized into "client transaction" and "server transaction" from the perspective of the SIP application servers. In FIG. 1, the client transaction is defined as a transaction in which the SIP application server serves as the UAC while the SIP terminal device serves as the UAS; in contrast, the server transaction is defined as a transaction in which the SIP application server serves as the UAS while the SIP terminal serves as the UAC.

The SIP is a type of signaling protocols, and the performance of transmitting and processing SIP messages is very important for SIP based applications. Many existed research works mainly focus on solving problems resulting from network environments and extremely high message flows. However, in practice, performance problems still exist and probably have serious impacts even when the workload is moderate and network resources are sufficient.

It is well known that the SIP is designed as a protocol independent of lower level transmission mechanisms. In practice, the User Datagram Protocol (UDP) is usually utilized to transmit SIP messages. Since the UDP does not ensure that the messages can be delivered reliably, a message retransmission mechanism is designed in the SIP to improve the reliability of message delivery. In fact, as the sender has no knowledge of the delivery procedure of the transmitted messages in the network, it can not be determined by the sender whether a certain message is lost or delayed during the process of message delivery or processing. Therefore when a required response message has not been received after a predetermined period of time, the sender will retransmit the transmitted message until the required response message has been received or the transmission has been timeout. If the initial message is not lost but delayed, and the sender has retransmitted the message, both of the initial message and the retransmitted message(s) will reach the destination. At this time, the retransmitted message does not carry more information, but increases the processing overhead at the destination, such retransmission is referred to as redundant retransmission. In an IP network, since a SIP User Agent (UA), which is located between a SIP terminal and a SIP application server, cannot have the global view of the SIP message transmission and processing, the redundant retransmission of the messages is inevitable and such redundant retransmission may heavily and negatively affect the performance of the application server when processing a large amount of SIP transactions.

FIG. 2 shows the transmission of the SIP messages among the SIP terminal, the SIP stateless proxy, and the SIP application server in the SIP application architecture as shown in FIG. 1 according to the prior art. As shown in FIG. 2, the SIP stateless proxy forwards all the SIP messages passing through it, including the initial and retransmitted SIP requests and responses. Redundantly retransmitted messages will increase the overhead of the SIP application server. When the number of the redundantly retransmitted messages cannot be neglected, these messages will considerably affect the performance of the SIP application server, for example, increasing CPU utilization ratio and memory usage, message processing delay, and/or decreasing the throughput, etc. Moreover, the quality of service (QoS) in the SIP application server would be affected if the retransmission overhead is heavy. Experiment data have shown that redundant retransmission occurs extensively and has the following severe impacts: more than 10% decrease of the throughput and tens of times increase of the processing delay in the SIP application server.

How to identity whether the transmissions are redundant retransmission or necessary transmission from the normally transmitted SIP messages and how to prevent the redundant retransmission or reduce the negative impacts of the redundant retransmission as much as possible is one of the important factors of improving the performance of the SIP application servers.

At present, there are several mechanisms in SIP to prevent the negative impacts of the message redundant retransmission. For example:

(1) The intervals of generating retransmitted messages obey an exponential back-offs rule. For example, for the same message, the first retransmission is issued in T1 Millisecond (ms) after the initial delivery, and the second retransmission is issued in 2*T1 ms if necessary, ..., and so on.

(2) A SIP stateful proxy and UAs in the message delivery path can first provide a provisional response (e.g. a 1xx response) whenever receiving a request message. When provisional response is received, corresponding retransmission stops.

However, the above-mentioned mechanisms in the SIP can only decrease but not eliminate the redundant retransmission. For example, long path delay between the SIP UAs, long server response time etc may cause the retransmission. Generally, the processing of the retransmission is only performed in the UAs. However, the UAs are not the only proper location to identify and prevent the redundant retransmission. For example, in the typical SIP application architecture as shown in FIG. 1 in order to eliminate the impacts of the redundant retransmission, the SIP stateless proxy can be enabled to identify and reject the redundant retransmission of the messages so as to relief the workload of the SIP application servers.

Therefore, in consideration of the above mentioned circumstances, what is needed is a novel method and device for rejecting the redundant retransmission of SIP messages at the front end of SIP application server clusters, for example, in a SIP stateless proxy, so as to relief the workload of the SIP application servers.

In addition, in order to reject and eliminate the redundant retransmission of the SIP messages as much as possible, it is required to determine which of the messages are the redundantly retransmitted messages, therefore, it is necessary to allocate a certain amount of memory space for each SIP transaction to keep some necessary information about the transaction, in order to appropriately respond to the retransmitted messages. However, in the practical SIP applications, there are often numerous SIP transactions concurrently from a plurality of SIP terminals. Experiment data have shown that each SIP transaction needs at least 2 KB memory. Therefore, when there are a large number of SIP transactions in a SIP system at the same time, the required memory space can be considerably large. However, in many cases, the memory space is not sufficient, for example, in a switch, a multi-functional SIP stateless proxy or a SIP offload engine. In view that not all of the SIP transactions will retransmit some of their messages in the practical applications, storing necessary information for all the ongoing SIP transactions inevitably wastes the memory space.

Considering the fact that the memory space is often limited inmost cases, what is also needed is a method and device for allocating available memory space to SIP transactions tend to be retransmitted when the memory space is limited, so that the redundantly retransmitted SIP messages can be rejected with higher probability at the front end of the SIP application server, for example, in a SIP stateless proxy.

SUMMARY OF THE INVENTION

In order to provide basic understanding of some aspects of the present invention, a brief summary of the present invention is given hereinafter. It is to be understood that this summary is not an exhaustive generalization of the present invention. It is not intended to determine critical or important parts of the present invention, nor is it intended to define the scope of the present invention. The summary is only used to give some concepts in a simplified form, which will be used as the prolegomenon of the more detailed description discussed latter.

To solve the problems existed in the prior art described above, one object of the present invention is to provide a method and retransmission rejection device for rejecting received SIP messages which are redundantly retransmitted in a SIP application architecture, so as to relief the workload of a SIP application server.

Another object of the present invention is to provide a network device including the aforesaid retransmission rejection device, which is located between SIP terminals and a SIP application server and at the front end of the SIP application server.

Still another object of the present invention is to provide a method and network device for rapidly rejecting received SIP messages which are redundantly retransmitted in a SIP application architecture in the case where the memory space is limited.

Yet still another object of present application is to provide a corresponding computer readable storage medium and computer program product.

In order to achieve the above objects, according to one aspect of the present invention, there is provided a method for rejecting received Session Initiation Protocol (SIP) messages which are redundantly retransmitted in a SIP application architecture, wherein the message type and transmission direction of the SIP messages are known, said method comprising: (a) forwarding all the messages transmitted from a SIP application server to a SIP terminal according to the transmission direction of said SIP messages; and (b) determining whether the received SIP messages transmitted from the SIP terminal to the SIP application are redundantly retransmitted based on the transmission direction of said SIP messages, and dropping all the received SIP messages redundantly retransmitted from the SIP terminal to the SIP application server, and anew responding to the dropped SIP messages according to the message type thereof.

According to another aspect of the present invention, there is provided a retransmission rejection device fox rejecting received SIP messages which are redundantly retransmitted in a SIP application architecture, wherein the message type and transmission direction of said SIP messages are known, said device comprising: a retransmission identifier for determining whether received SIP messages transmitted from a SIP terminal to a SIP application server are redundant retransmitted; and a message processor for forwarding all the received messages transmitted from the SIP application server to the SIP terminal, dropping all the received SIP messages redundantly retransmitted from the SIP terminal to the SIP application server, and anew responding to the dropped SIP messages according to the message type thereof.

According to still another aspect of the present invention, there is provided a network device for rejecting redundant retransmission of received SIP messages in a SIP application architecture, which is located between a SIP terminal and a SIP application server and at the front end of the SIP application server, the network device comprising: a transaction table including transaction items with transaction information of said SIP messages stored thereon; and a retransmission rejection device described above.

According to yet still another aspect of the present invention, there is provided a method for rapidly rejecting received SIP messages which are redundantly retransmitted in a SIP application architecture, comprising: performing retransmission detection of a received SIP message so as to determine whether said message is a retransmitted message; updating a retransmission indicator of the message sender once the retransmission of the message has been detected; performing message classification of the received SIP message according to the value of the retransmission indicator of the message sender, so as to determine whether said message is tend to be retransmitted; and for the SIP message tend to be retransmitted, executing steps of the method for rejecting the received SIP messages which are redundantly retransmitted in the SIP application architecture described above.

According to yet still another aspect of the present invention, there is provided a network device for rejecting received SIP messages which are redundantly retransmitted in a SIP application architecture, which is Located between a SIP terminal and a SIP application server and at the front end of the SIP application server, said network device comprising a transaction table including transaction items with transaction information of said SIP messages stored thereon; a retransmission detector for performing retransmission detection of a received SIP message so as to determine whether said message is a retransmitted message, and once the retransmission of the message is detected, notifying a message classifier to update a retransmission indicator of the message sender; the message classifier, for performing message classification of the received SIP message according to the value of the retransmission indicator of the message sender, so as to determine whether said message is tend to be retransmitted; and a retransmission rejection device for performing a retransmission rejection process on the SIP message tend to retransmission in the SIP application architecture described above.

According to other aspects of the present invention, there are provided a corresponding computer readable storage medium and computer program product.

One advantage of the present invention lies in that, by processing the redundantly retransmitted SIP messages at the front end of the SIP application server, the workload on the SIP application server can be reduced as much as possible, better quality of service (QoS) can be achieved and operating costs can be reduced, while the throughput of the SIP calls are maintained or increased.

Another advantage of the present invention lies in that, the limitation of the memory space has been considered in the present invention, and the retransmission rejection process is only performed on the transactions that are prone to retransmission, the redundant retransmission of the messages can be rapidly rejected, the number of the messages requiring the retransmission rejection process can be reduced, and the overhead of the retransmission rejection process can also be reduced.

These and other advantages of the invention will be more apparent from the detailed description of preferred embodiments of the invention given with reference to the accompanying drawings.

BRIEF DESCRIPTION OF THE DRAWINGS

The present invention will be better understood by referring to the following description taken in conjunction with the accompanying drawings, and the same or similar reference number are used to denote the same or similar elements throughout the drawings. The drawings together with the following detailed description are incorporated into the specification and formed as a part thereof, and are used to further illustrate preferred embodiments of the present invention and explain principles and advantages of the present invention, in which.

Figure 1:
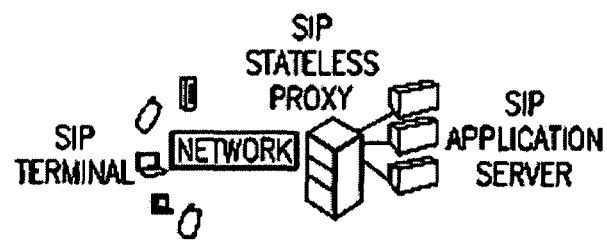
FIG. 1 shows a typical SIP application architecture in large-scale applications.
Figure 2:
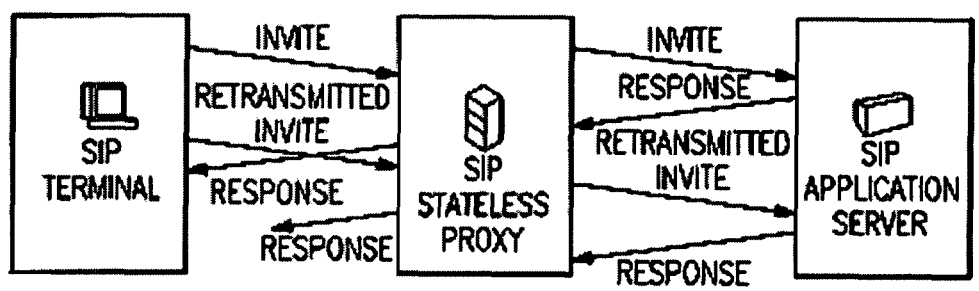
FIG. 2 shows the transmission of SIP messages among a SIP terminal, a SIP stateless proxy, and a SIP application server in the SIP application architecture as shown in FIG. 1 according to the prior art.

Those skilled in the art still appreciate that elements in the drawings are illustrated only for simplicity and clarity and have not necessarily been drawn to scale. For example, the dimensions of some of the elements in the drawings may be enlarged relative to other elements to help to improve understanding of the embodiments of the present invention.

DETAILED DESCRIPTION OF THE PREFERRED EMBODIMENTS

Exemplary embodiments of the present invention will be described in conjunction with the accompanying drawings hereinafter. For the sake of clarity and conciseness, not all the features of actual implementations are described in the specification. However, it is to be appreciated that during developing any of such actual implementations, numerous implementation-specific decisions must be made to achieve the developer's specific goals, for example, compliance with system-related and business-related constraints which will vary from one implementation to another. Moreover, it is also to be appreciated that such a development effort fight be complex and time-consuming, but may nevertheless be a routine task for those skilled in the art having the benefit of this disclosure.

Furthermore, it is noted herein that, in order to avoid obscuring the present invention due to unnecessary details, the drawings only show device structures and/or processing steps closely related to the solutions according to the present invention and other details less related to the present invention are omitted.

A method 400 (see FIG. 4 for the details) for rejecting redundantly retransmitted SIP messages in a SIP stateless proxy of the SIP application architecture as shown in FIG. 1 according to the first aspect of the present invention will be described in connection with FIG. 3 through FIG. 6 below.

Figure 3:
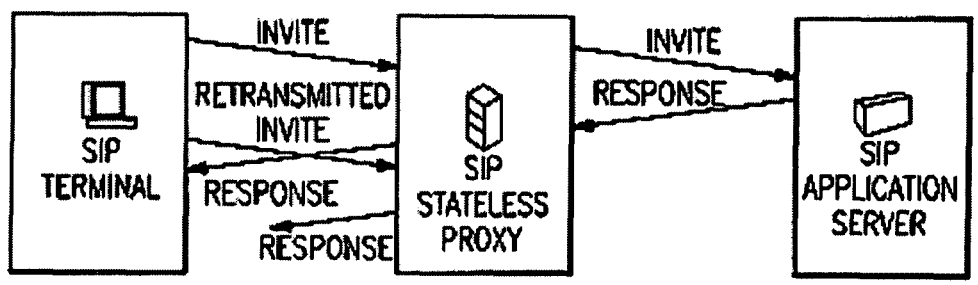
FIG. 3 shows the transmission of SIP messages among a SIP terminal, a SIP stateless proxy, and a SIP application server in the SIP application architecture as shown in FIG. 1 according to the present invention.
Figure 4:
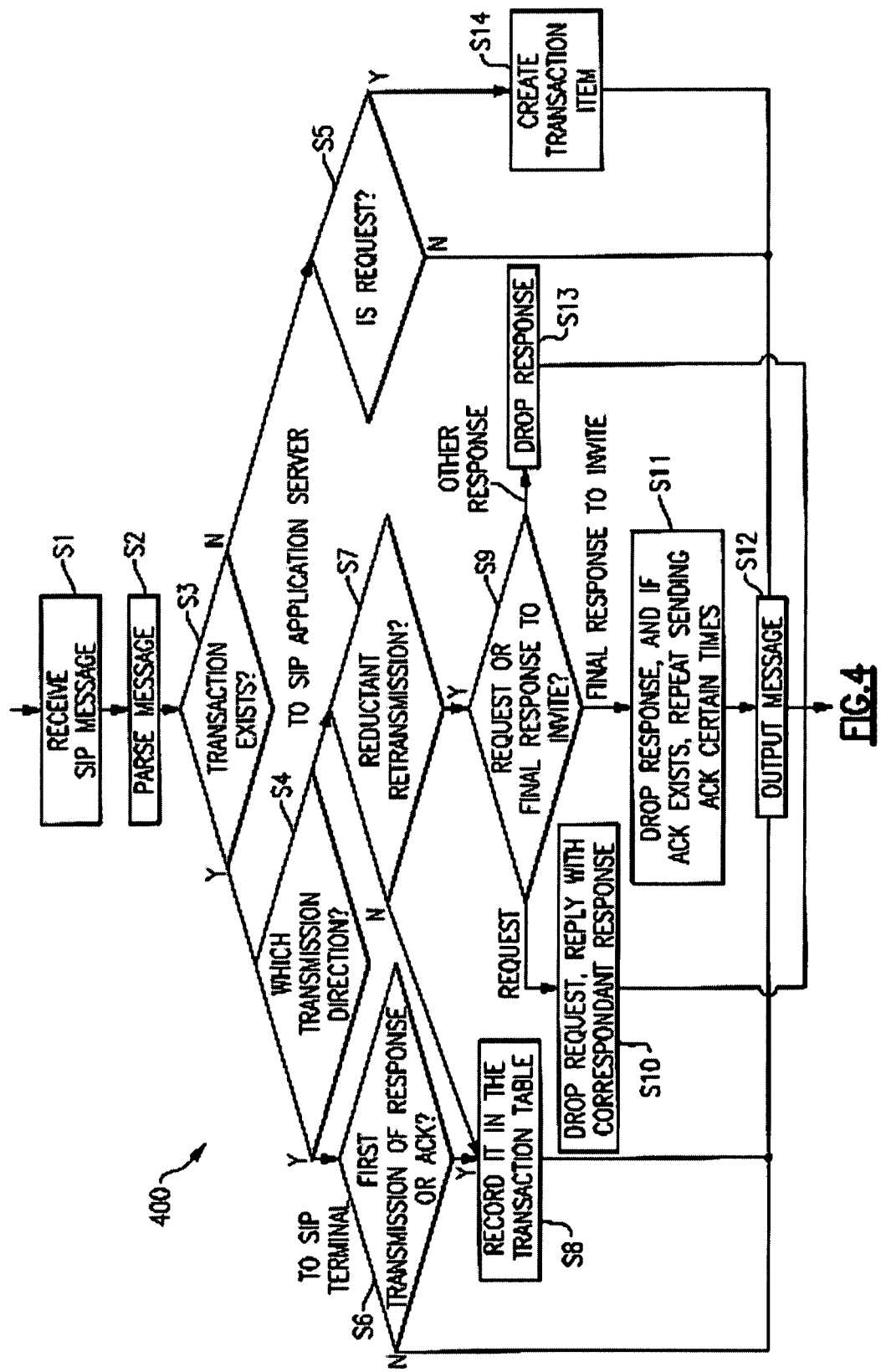
FIG. 4 illustrates a flow chart of a method for rejecting the redundant retransmission of SIP messages executed by a SIP stateless proxy according to a first aspect of the present invention.
Figure 5:
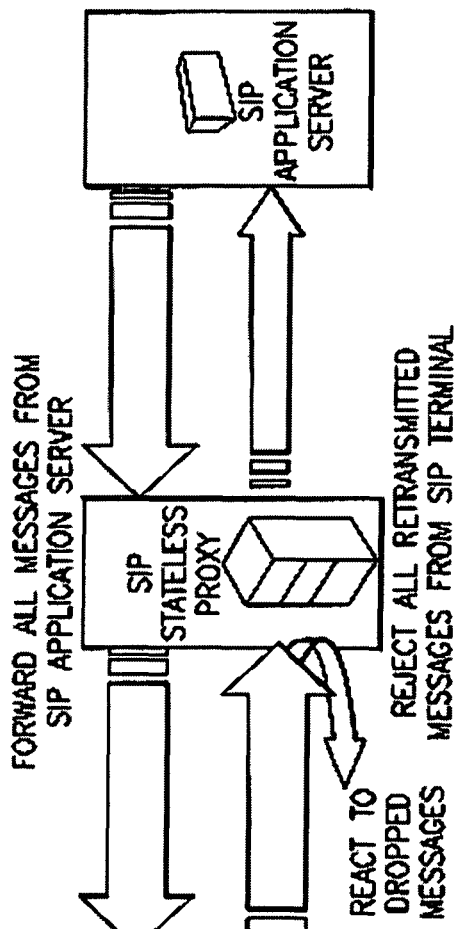
FIG. 5 illustrates a message processing procedure in said SIP stateless proxy when executing the method as shown in FIG. 4.
Figure 6:
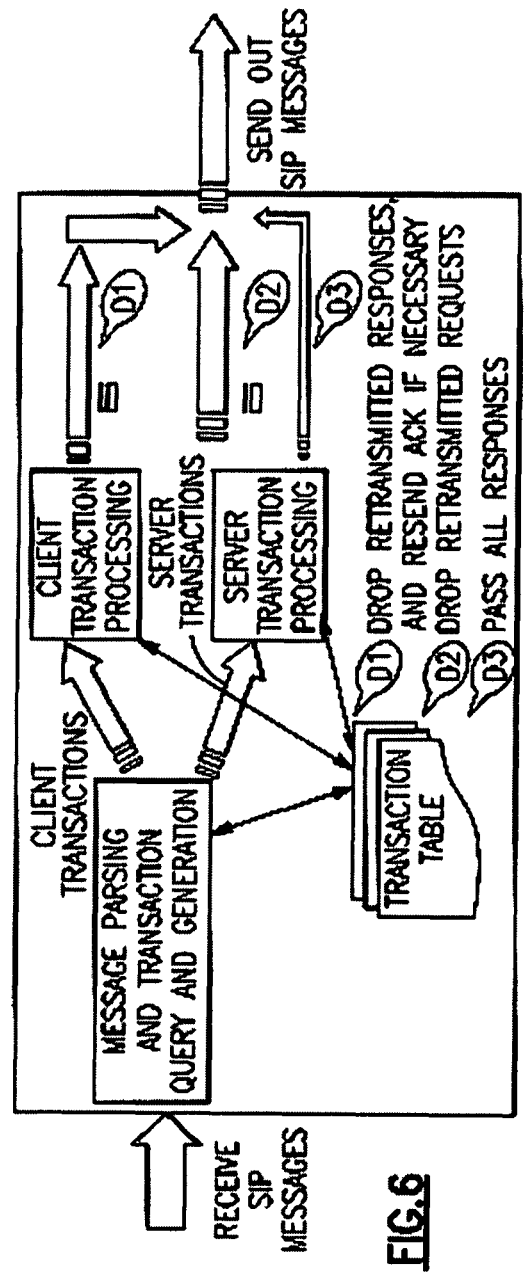
FIG. 6 illustrates a message processing procedure in said SIP stateless proxy when executing the method as show in FIG. 4 in terms of client transactions and server transactions.

Herein, based on the SIP application architecture as shown in FIG. 1, FIG. 3 shows the transmission of SIP messages among the SIP terminal, SIP stateless proxy and SIP application server when said method 400 has been applied to the SIP stateless proxy; FIG. 4 illustrates a flow chart of the process of said method 400; FIG. 5 illustrates a message processing procedure in said SIP stateless proxy when executing said method 400; and FIG. 6 shows a message processing procedure in said SIP stateless proxy when executing said method 400 in terms of client transactions and server transactions.

In the embodiments according to this aspect of the present invention, it is assumed that the SIP application architecture illustrated in FIG. 1 satisfies the following conditions:

(1) The SIP messages can be transmitted reliably between stateless proxy and the SIP application server;

(2) Each request sent from the SIP stateless proxy to the SIP application server can trigger a corresponding response and finally the response can be received by the SIP stateless proxy no matter how long it is delayed.

Based on the two assumptions described above, in the SIP application architecture illustrated in FIG. 1, the SIP stateless proxy can identify and process the redundantly retransmitted messages. All the SIP messages redundantly retransmitted from the SIP terminal to the SIP application server can be prevented by the SIP stateless proxy, and the SIP stateless proxy can directly respond to a retransmitted request if a response to this message has been received from the SIP application server. In addition, based on the two assumptions described above, as shown in FIG. 3, all the messages sent from the SIP application server to the SIP terminal will be forwarded by the SIP stateless proxy. In this way, the workload of processing retransmitted requests in the SIP application server can be reduced.

The SIP stateless proxy checks the SIP messages received (including the messages received from the SIP terminal and from the SIP application server) and maps them into SIP transactions. Based on the message type and transmission direction (the messages are sent from the SIP application server or sent to the SIP application server) of the messages, the SIP stateless proxy can take different actions to process the SIP messages.

FIG. 4 illustrates a flowchart of the method 400 for rejecting the redundantly retransmitted SIP messages executed by the SIP stateless proxy according to the first aspect of the present invention.

As shown in FIG. 4, at step S1, the SIP stateless proxy receives a SIP message from the SIP terminal or from the SIP application server.

At step S2, the SIP stateless parses the received message so as to obtain necessary information, for example, the message type, sending sources and transmission direction thereof.

Then, the process of the method 400 proceeds to step S3, where transaction query is executed based on the result of the message parsing, that is, it is determined whether a transaction item of transaction information corresponding to the received message is stored in a transaction table.

The transaction table is used to keep current transaction information of the SIP message, including transaction ID, message arrival time, a corresponding latest response message and so on (all of which constitute a transaction item). The size of the transaction table is usually limited by the available memory space. In addition, since the number of the SIP messages to be processed is huge, the transaction table is accessed frequently for performing manipulation of transaction items, such as inserting, finding, updating, deleting and so on. Herein, the transaction table can be implemented by any known structures which can facilitate the manipulation of the transaction items such as inserting, finding, updating, deleting and so on, and it is stored in the SIP stateless proxy.

If it is determined at step S3 that there exists said corresponding transaction information, the process of the method 400 proceeds to step S4, otherwise, the process proceeds to step S5.

At step S4, the transmission direction of the received message is determined, that is, it is determined whether the message is to be sent to the SIP terminal or to the SIP application server.

If it is determined at step S4 that the received message is to be sent to the SIP terminal, then the process proceeds to step S6 to determine whether this message is the first transmission of a response or acknowledge (ACK).

If it is determined at step S6 that it is the first transmission of the response or ACK, then the process proceeds to step S8, where this message is recorded in the transaction item related to this message in the transaction table. Then the process proceeds to step S12.

If the determination result is NO at step S6, the process proceeds to step S12.

At step S12, the SIP stateless proxy outputs the received message (sends this message to the SIP terminal).

The steps S4-S6-(S8)-S12 described above indicates that all the messages (including requests and responses) sent from the SIP application server to the SIP terminal will be forwarded by the SIP stateless proxy, wherein step S8 is to ensure that the corresponding responses of the received messages will be recorded in the transaction table, so it is sufficient to record the responses and ACKs only when they are transmitted for the first time in the transaction table.

If it is determined at step S4 that the received message is to be sent to the SIP application server, the process proceeds to step S7, where it is determined whether the message is redundantly retransmitted.

If it is decided that said message is redundantly retransmitted, the SIP stateless proxy will prevent further transmission of this message, and respond to this redundant retransmission directly.

Specifically, if the determination result is YES at Step S7, the process of the method 400 proceeds to step S9 to determine the type of this message, that is, to determine whether or not the message is a request or a final response to an INVITE transaction.

If the determination result is NO at step S7, that is, if said message is not redundantly retransmitted message, the process proceeds to step S8 to record this message in the transaction item of the transaction table. Then, the process proceeds to step S12, where the SIP stateless proxy outputs said message.

If it is determined at step S9 that said redundantly retransmitted message is a request, then the process proceeds to step S10, where the SIP stateless proxy drops this redundantly retransmitted request and responds to the dropped request depending on the actual circumstances. Specifically, if a corresponding response thereof has been received, the SIP stateless proxy responds to this request with an appropriate response (e.g., with a provisional response if a final response does not exist in the transaction table; and with the final response if the final response exists); and if the corresponding response thereof has not been received, the SIP stateless prow directly drops the message without any response.

If it is determined at step S9 that said redundantly retransmitted message is the final response to the INVITE, the process proceeds to step S11, where a corresponding ACK is used to respond thereto. If the corresponding ACK has not been received, a register is used to hold the number of the final responses that have not been responded, and once the ACK has been received, said ACK is repeatedly sent multiple times correspondingly (i.e., the times of repeatedly sending the ACK equals to the number of the final responses that have not been responded).

Herein, for the purpose of simplicity, the flow of the operations described above is omitted and only simply represented by steps S10 and S11 in FIG. 4. However, it is apparent that those skilled in this art can readily draw a corresponding flow chart based on the above literal description.

If it is determined at step S9 that said redundantly retransmitted message is neither a request nor the final response to the INVITE, but other response, the process proceeds to step S13, where said other response is dropped and no message is outputted.

In the flow chart of the method 400 as illustrated in FIG. 4, if the SIP stateless proxy determines that the corresponding transaction information of said received message does not exist in the transaction table (which indicates that this message has not been recorded in the transaction table), and said received message is a request, i.e., if the decision result is YES at step S5, the process proceeds to step S14, where a transaction item corresponding to said received message is created and inserted into the transaction table. Then, the process proceeds to step S12 to output said received message. In addition, if the decision result is NO at step S5, the process also proceeds to step 12 to output said received message.

FIG. 5 illustrates the message processing procedure in said SIP stateless proxy when executing the method 400. As shown in FIG. 5, in the SIP stateless proxy, all the messages transmitted from the SIP application server are forwarded to the SIP terminal; all the messages retransmitted from the SIP terminal to the SIP application server are dropped, and the following operations are executed according to the type of the dropped messages. If the dropped message is a request and one or more corresponding responses have been received, the request is responded with an appropriate response; if the dropped message is a final response to the INVITE transaction, it is determined whether a corresponding ACK has been received, if not, it is recorded how many final responses which have not been acknowledged (the number thereof is represented by ReplyNum) are received until the corresponding ACK has been received, then the ACK is sent ReplyNum times repeatedly; and if the dropped message is a response other than the aforesaid final response, no other process will be executed anymore, that is, no message is outputted to the SIP application server.

FIG. 6 illustrates the message processing procedure in said SIP stateless proxy when executing the method 400 in terms of client transactions and server transactions.

As shown in FIG. 6, after a SIP message has been received from the SIP terminal or the SIP application server, the SIP stateless proxy parses the message and finds the corresponding transaction information in the transaction table. Then, the SIP stateless proxy performs different operations depending on the result of whether said transaction information is a client transaction or a server transaction.

As described in the Background of the Invention, a client transaction is a transaction whose UAC is the SIP application server and UAS is the SIP terminal, that is, the client transaction includes requests transmitted from the SIP application server to the SIP terminal and responses transmitted from the SIP terminal to the SIP application server; while a server transaction is a transaction whose UAC is the SIP terminal and UAS is the SIP application server, that is, the server transaction includes requests transmitted from the SIP terminal to the SIP application server and responses (as well as ACKs) transmitted from the SIP application server to the SIP terminal.

For the client transactions, as shown in D1 of FIG. 6, all the requests from the SIP application server are passed to the SIP terminal, while all the responses retransmitted from the SIP terminal to the SIP application server are dropped, and the ACK is sent certain times if necessary.

For the server transactions, as shown in D3 of FIG. 6, all the responses from the SIP application are passed to the SIP terminal, and also as shown in D2 of FIG. 6, all the requests retransmitted from the SIP terminal to the SIP application server are dropped. At this time, if there are responses correspond to the dropped requests, appropriate responses are replied to the SIP terminal.

It would be noted herein that, although the process of the method 400 executed by the SIP stateless proxy according to the present invention has been described above with reference to the flow chart as shown in FIG. 4, those skilled in this art would understand that, based on the above description, a flow chart partially or entirely different from the flow chart as shown in FIG. 4 can obviously be drawn, wherein the processing steps and the sequence thereof may be partially or entirely different from the steps and the sequence illustrated in FIG. 4. That is to say, according to the teaching given above, the SIP stateless proxy can execute a process different from the above-mentioned method 400 to reject the redundantly retransmitted SIP messages sent to the SIP application server, as long as the process can satisfy the message processing procedure as shown in FIG. 5 in principle.

In addition, it should be noted that, the operations of steps S10 and S11 in the above method 400 are executed to satisfy the relevant protocol requirements of the SIP, thus the details of these steps are not given in the above description.

Figure 7:
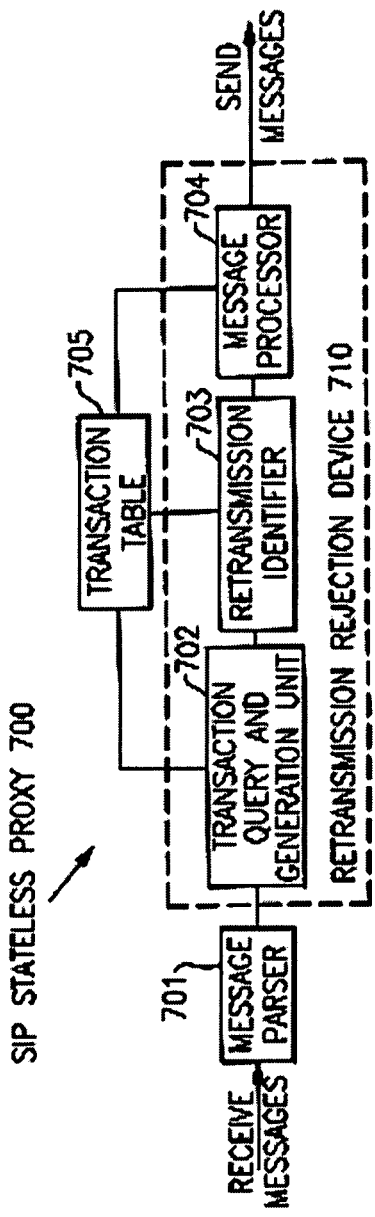
FIG. 7 illustrates a schematic block diagram of the SIP stateless proxy according to the first aspect of the present invention.

FIG. 7 illustrates a schematic structure of a SIP stateless proxy 700 according to an embodiment of the present invention. The SIP stateless proxy 700 can execute the method described above in connection with FIG. 4.

As show in FIG. 7, the SIP stateless proxy 700 includes: a message parser 701 for parsing messages received by the SIP stateless proxy; a retransmission reject device 710 for executing the operations of steps S3 through S14 in the flow chart shown in FIG. 4 (specific functions and operations thereof will be described in detail hereinafter); and a transaction table 705 for storing current transaction information including transaction IDs, message arrival times, corresponding responses and so on. As shown in FIG. 7, the retransmission reject device 710 includes a transaction query and generation unit 702, a retransmission identifier 703 and a message processor 704.

The transaction query and generation unit 702 performs transaction information query and/or transaction item generation, specifically, to find whether the transaction information corresponding to a received SIP message exists in the transaction table 705, and if the corresponding transaction information cannot be found and the received SIP message is a request, a transaction item is created and inserted into the transaction table, and the transaction information such as the transaction ID and message arrival time of the message is recorded in the transaction item.

The retransmission identifier 703 is used to identify whether the received SIP message is transmitted for the first time or redundantly retransmitted, and notify the result to the message processor 704.

The message processor 704 performs different operations on the received SIP message dependent on the result that the received message is a request, a final response to an INVITE transaction or other response according to the above retransmission identification (see steps S8, S9, S10, S11, S12 and S13 in the flow chart as shown in FIG. 4 for details).

It is obvious that functions and processes of each module or unit have been clearly described above in connection with FIGS. 3 to 6, thus, for the purpose of clarity of the specification, the details thereof are not described here anymore.

In the method 400 and the SIP stateless proxy 700 according to the present invention described above, since the number of the SIP messages to be processed is very huge, the transaction table is frequently inserted, found, updated, deleted and so on, so the processing speed of the method 400 and the performance of the SIP stateless proxy 700 are seriously influenced by the manipulation of the transaction table.

In order to rapidly insert, find, update and delete transaction information or transaction items in the practical processing procedure, in one preferred embodiment of the present invention, a fixed-size hash table is employed to implement the transaction table, and multiple hash functions are utilized for collision avoidance and fast lookup. In addition, considering the limitation of the memory space, time expiration is set for each transaction item, and expired transaction items are allowed to be deleted in the case there the memory space is insufficient.

Assume that the size of the hash table is m, that is, assume that the hash table is an array with the length of m, the hash table can be expressed as $(A_0, A_1, \ldots, A_{n-1})$, wherein $A_i$ is an address pointer pointing to the real storage location storing the related transaction item. For the sake of convenience, $A_0$, $A_1, A_{n-1}$, are referred to as the $0^{th}, 1^{st}, \ldots, (m-1)^{th}$ position in the transaction table.

In addition, it is also assumed that, k hash functions $H_1$, $H_2, \ldots, H_k$ are selected, and the transaction ID (represented by x) is used as the keyword of a transaction item to execute hashing. The hash functions $H_1, H_2, \ldots, H_k$ can map x into an integer within the interval of $(0, 1, \ldots, m-1)$.

If a new transaction item is needed to be inserted into the hash table, then for each function $H_i(x)$ ($1 \leq i \leq k$), it is decided whether the $H_i(x)^{th}$ position is empty in sequence, and once it is found that the position of a certain function $H_i(x)$ is empty, the address pointer pointing to the real storage location (or memory location) of this new transaction item is placed in this position. Otherwise, if none of the positions of all the functions $H_i(x)$ ($1 \leq i \leq k$) is empty, then it is decided in sequence whether the transaction item in the $H_i(x)^{th}$ ($1 \leq i \leq k$) position has been expired or not (for example, it can be decided from the message arrival time and the set time expiration of the message), and once it is decided that the transaction item in the $H_i(x)^{th}$ position has been expired, the expired transaction item is replaced by this new one. If none of the transaction items in the positions of all the functions $H_i(x)$ ($1 \leq i \leq k$) has expired, then the oldest transaction item is replaced by this new one.

As for the operation of finding a transaction item, the procedure of this operation is the inverse of the above-mentioned procedure of inserting a transaction item. Specifically, in order to find a transaction item with the transaction ID x, the memory location pointed thereto by the address pointer stored in the $H_i(x)^{th}$ ($1 \leq i \leq k$) position in the hash table is found in sequence, to determine whether the transaction ID stored therein is x. For the sake of simplicity and convenience, hereinafter, the above mentioned operation is simply describe as finding the $(H_i(x)^{th}$ ($1 \leq i \leq k$) position in the hash table to find the transaction item with the transaction ID x.

Once the transaction item with the transaction ID x is found in the position of a certain function $H_i(x)$ ($1 \leq i \leq k$), the finding procedure terminates. If the required transaction item fails to be found in the positions of all the functions $H_i(x)$ ($1 \leq i \leq k$), the finding procedure will return null.

To accelerate the manipulation of the hash table, $H_1$, $H_2, \ldots, H_k$ should be selected properly. Since the transaction ID is a character string, in a further preferred embodiment of the present invention, $H_1$ is selected as a hash function adapted to execute hashing of characters, and all the subsequent $H_2, \ldots, H_k$ may be selected as hash functions for performing bit manipulation of the result of $H_1(x)$.

The SIP stateless proxy and the processing method thereof according to one aspect of the present invention have been described above in connection with FIGS. 3-7. The SIP stateless proxy can reject the redundantly retransmitted SIP messages, drop all the messages retransmitted from the SIP terminal to the SIP application server and directly make proper responses depending on different classifications of the dropped messages without forwarding the redundantly retransmitted messages to the SIP application server for further processing, thus, the message processing workload of the SIP application server can be efficiently reduced.

However, as described hereinbefore, in the above method and SIP stateless proxy, all the received SIP messages are required to be mapped into corresponding SIP transactions, and all the transaction information (including the arrival times, current states, received corresponding responses and so on) should be kept for a period of time, so that the redundantly retransmitted messages can be identified and proper responses can be made according to the state of the transactions. Therefore, it is required to allocate a certain amount of memory space for each SIP transaction.

In the practical applications, the SIP transactions will continue for a period of time (as for the INVITE transaction, this period of time may be one or several seconds), thus a large number of concurrent transactions can be observed at the SIP stateless proxy, therefore, the memory space required for these transactions is considerably large. However, in many cases, the memory space is often insufficient. Considering the following two main issues: (1) the speed of identifying the redundantly retransmitted messages and responding thereto, (2) the amount of available memory space when lots of concurrent transactions exist at the same time, and in view of the fact that not every SIP transaction will retransmit some messages thereof in the real applications, therefore, when the memory space is limited, it should be ensured that the available memory space is allocated to those SIP transactions tend to be retransmitted so that the memory space can be saved.

To this end, according to another aspect of the present invention, improvements are made on the method and SIP stateless proxy described above, so that the redundantly retransmitted messages can be rejected rapidly in the SIP stateless proxy in the case where the memory space is limited.

Figure 8:
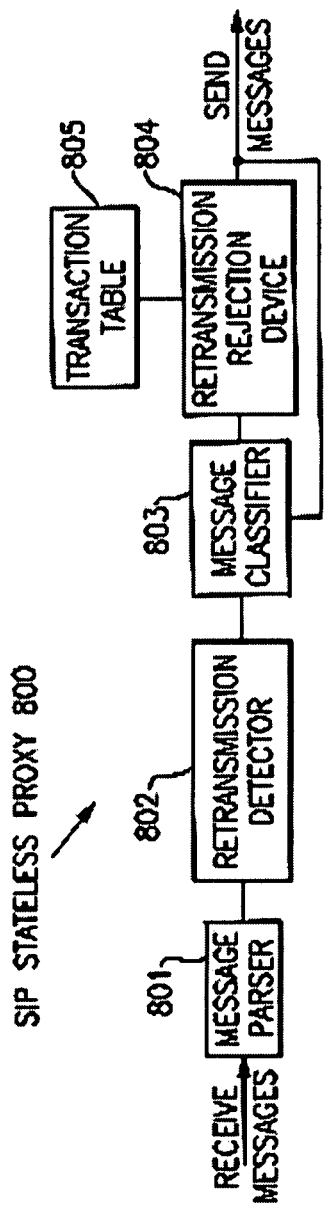
FIG. 8 illustrates a schematic block diagram of a SIP stateless proxy after improvement is made on the SIP stateless proxy as shown in FIG. 7 according to a second aspect of the present invention.
Figure 9:
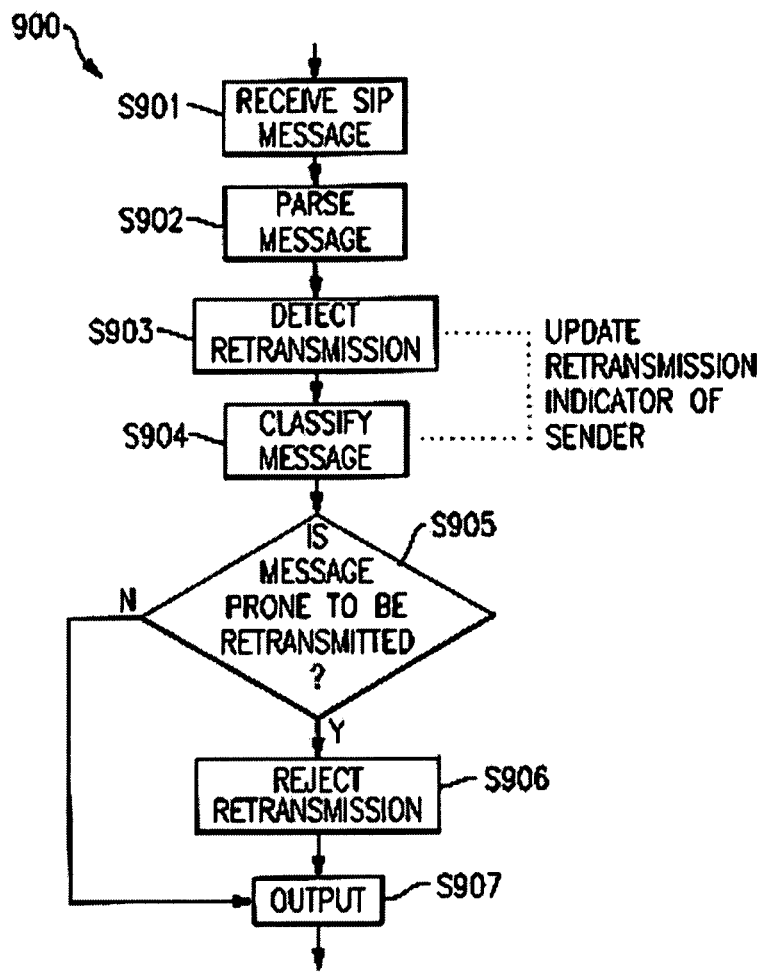
FIG. 9 illustrates a flow chart of a method for rapidly rejecting the redundant retransmission of SIP messages executed by the SIP stateless proxy as shown in FIG. 8 according to the second aspect of the present invention.

Still taking the SIP application architecture shown in FIG. 1 as an example, the application according to said another aspect of present invention is described with reference to FIGS. 8-9. FIG. 8 illustrates a schematic structure block diagram of a SIP stateless proxy 800 after improvements are made on the SIP stateless proxy 700 shown in FIG. 7 in the case where the memory space is limited, and FIG. 9 shows a method 900 for rapidly rejecting the redundantly retransmitted SIP messages executed by the SIP stateless proxy 800 in the case where the memory space is limited.

In this aspect of the present invention, it is assumed that, once it is determined that a SIP message has been retransmitted from a certain sender, then it can be regarded that all the messages from this sender within a subsequent predetermined period of time are tend to be retransmitted.

As shown in FIG. 8, the SIP stateless proxy 800 comprises a message parser 801, a retransmission detector 802, a message classifier 803, a retransmission reject device 804 and a transaction table 805.

The functions of the message parser 801 and transaction table 805 are the same as those of the message parser 701 and transaction table 705 as shown in FIG. 7 thus, the description thereof is omitted herein to avoid repetition.

The retransmission detector 802 performs retransmission detection of the SIP messages received by the SIP stateless proxy 800, that is, checks whether the received messages are retransmitted, and if the retransmission is detected, notifies the message classifier 803 to update a retransmission indicator of the message sender.

The message classifier 803 classifies the messages, that is, determines if the received messages are tend to be retransmitted according to the retransmission indicator of the message sender. Then, from among all the received messages, the message classifier 803 sends to the retransmission reject device 904 those messages which are tend to be retransmitted, and directly outputs other messages without being processed by the retransmission reject device 804. Herein, the maximum rate of the messages sent to the retransmission reject device 804 for further processing by the message classifier 803 is limited by available memory space in the SIP stateless proxy 800.

The retransmission reject device 804 performs processing on the SIP messages sent from the message classifier 803 which are tend to be retransmitted, to check whether the messages are redundantly retransmitted and make proper responses if so. The function and processing procedure of the retransmission reject device 804 are the same as those of the retransmission reject device 710 as shown in FIG. 7, so the detailed description thereof is omitted herein.

By arranging the retransmission detector and message classifier in front of the retransmission reject device 800 in the SIP stateless proxy 800, the amount of messages requiring the retransmission rejection process can be reduced, and thus the overhead of the retransmission rejection device and transaction table can be reduced. The processing delay and the occupation rate of the memory space can be reduced effectively if the message classification is efficient and correct.

The detailed processes of the above mentioned modules or device in the SIP stateless proxy 800 will be further described hereinafter by referring to the flow chart of the method 900 as illustrated in FIG. 9.

As shown in FIG. 9, at step S901, the SIP stateless proxy 800 receives a SIP message from the SIP terminal or SIP application server.

Then, at step S902, the message parser 801 parses the received SIP message so as to obtain necessary information such as the message type, sending source and so on.

Subsequently, the process of the method 900 proceeds to step S903, where the retransmission detector 802 performs retransmission detection of the received messages i.e., checks whether said message is retransmitted, once the retransmission of the message has been detected, the retransmission detector 802 notifies the message classifier 803 to update a retransmission indicator of the sender.

Next, the process proceeds to step S904, where the message classifier 803 classifies the received message according to the retransmission indicator of the sender of the retransmission. That is, if a retransmitted message has been detected at step S903, then, the message sender is recorded and/or the retransmission indicator of the sender is update in the message classifier 803, and the received message is classified, i.e., it is determined whether this message is tend to be retransmitted or not, according to the retransmission indicator of the sender.

Then, at step S905, it is determined whether said message is tend to be retransmitted. For example, this determination step can be executed by the message classifier 803 based on whether the value of the retransmission indicator of the message sender is larger than a predetermined threshold, and it is decided whether to send said message to the retransmission reject device 804 or not based on the determination result.

It said message is decided as being tend to be retransmitted at step S905, then at step S906, the retransmission reject device performs a retransmission rejection process on said message tend to be retransmitted, forwards all the messages transmitted from the SIP application server to the SIP terminal, while drops all the messages redundantly retransmitted from the SIP terminal and then makes appropriate responses depending on the dropped messages. The processing procedure of step S906 corresponds to the processing procedure of steps S3 to S11, S13 and S14 of the method 400 described above in connection with FIG. 4, thus, the detailed description thereof is omitted herein for the sake of conciseness.

After performing the retransmission rejection process on the message tend to be retransmitted, the process of the method 900 proceeds to step S907 to output corresponding messages.

If it is determined that said message is not tend to be retransmitted, then the process of the method 900 proceeds to step S907 to directly output said received message.

From the above description presented in connection with FIGS. 8 and 9, by performing the retransmission detection and message classification at the front end of the retransmission reject device 710 as shown in FIG. 7, and then only executing the process of the method 400 described in conjunction with FIG. 4 on the SIP messages tend to be retransmitted among the received messages, the number of the SIP messages requiring the retransmission rejection process in the SIP stateless proxy 800 is reduced, thus rapid operations can be achieved.

In this aspect of the present invention described in connection with FIGS. 8 and 9, considering the limitation of the memory space, the performance of the SIP stateless proxy 800 and the processing speed of the method 900 are greatly influenced by the design of the retransmission detector, message classifier, and transaction table.

To this end, in a further preferred embodiment of the present invention, in order to further save the memory space and to perform more rapid insertion, finding, update and deletion of the transaction items in the transaction table, both the retransmission detector 802 and the message classifier 803 as shown in FIG. 8 are implemented by a Bloom filter, respectively, and the transaction table 805 shown in FIG. 8 is implemented by a two-level transaction table. The detailed description thereof is presented below in connection with FIGS. 10-12.

Figure 10:
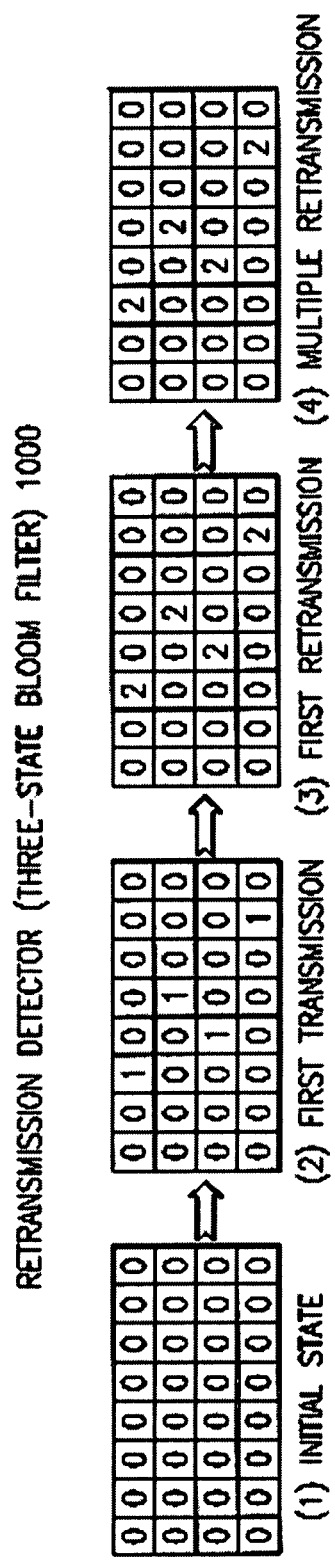
FIG. 10 shows a schematic structure diagram of a three-state Bloom Filter (BF) for implementing a retransmission detector as shown in FIG. 8 according to one preferred embodiment of the present invention.
Figure 11:
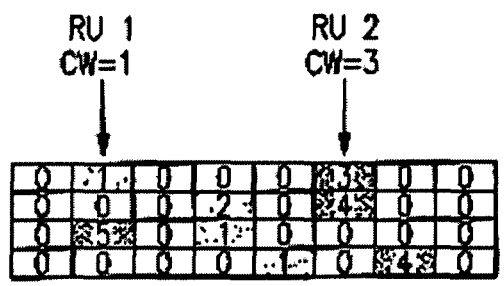
FIG. 11 shows a schematic structure diagram of a countable Bloom Filter (CBF) for implementing a message classifier as shown in FIG. 8 according to the preferred embodiment of the present invention.
Figure 12:
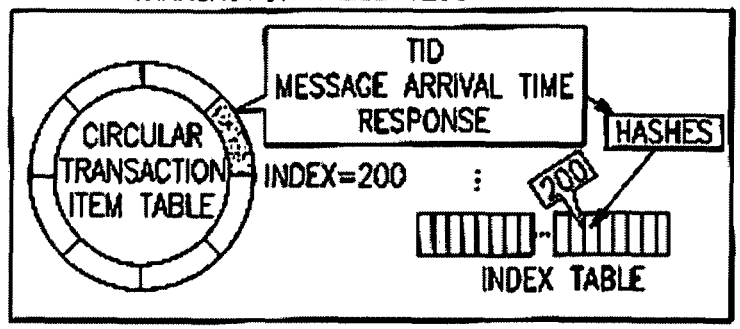
FIG. 12 shows a schematic structure diagram of a two-level transaction table employed in the preferred embodiment of the present invention.

FIG. 10 shows a schematic structure diagram of a three-state Bloom Filter (BF) for implementing the retransmission detector according to a preferred embodiment of the present invention; FIG. 11 shows a schematic structure diagram of a countable Bloom Filter (BF) for implementing the message classifier according to this preferred embodiment of the present invention; and FIG. 12 shows a schematic structure diagram of a two-level transaction table utilized in this preferred embodiment of the present invention.

A standard Bloom filter uses a hash function group (HFG) including s independent hash functions, to hash one element so as to obtain a group of position coordinates corresponding to this element. An element can be judged as present only when all the positions pointed to by the s hash values of this object are flagged. In short, the standard Bloom filter identifies the existence of an element by a s-dimension flag vector. The details of the standard Bloom filter are described in "Space/time trade-offs in hash coding with allowable errors" by Burton Bloom, CACM, 13(7); 422-426, July 1970, only parts of contents thereof that are highly related to the present invention are explained here.

As described in FIG. 8, the retransmission detector 802 detects whether a message is retransmitted or not, and notifies the message classifier to flag the message sender. This means that the retransmission detection will configure the message classifier module. In this embodiment, a three-state Bloom Filter (BF) 1000 (which is abbreviated as message filter hereinafter) is employed to implement the retransmission detector.

As for each SIP message, the message filter 1000 hashes the whole message, and looks up in the message filter according to the calculated hash values. After the hash calculation, a retransmitted message will have the same hash values, whereas other messages have different hash values. Therefore, if the hash values have been flagged in the message filter, then it means that this message is a retransmitted message; and the corresponding sender is kept in the message classifier, that is, the retransmission indicator of the sender is recorded or updated in the message classifier. If the hash values have not been flagged in the message filter, then it means that this message is one transmitted for the first time (that is, non-retransmitted message), and the hash values will be flagged in the message filter.

Specifically, as shown in FIG. 10, for the sake of convenience, the message filter 1000 is represented visually by a table with four rows and eight columns. In practice, all the positions in this table constitute an array, and four independent hash functions hash a message to present four independent positions. Suppose that the initial state of the message filter is shown as the leftmost table in FIG. 10, in which the initial values of all the positions are zero (0).

When a certain SIP message is received for the first time, this message is hashed and 1 is flagged in the positions corresponding to the hash values of this message to indicate that this message has been transmitted, for example, as shown by the second table in FIG. 10. In this case the message filter further notifies the message classifier to update the retransmission indicator of the sender.

When a retransmitted message has been received, the same hash values will be obtained after the hash calculation of this message, and if the values of the positions corresponding to the hash values are flagged as 1, then the values of the positions are changed from 1 to 2, to indicate that this message is a retransmitted message, for example, as shown by the third table in FIG. 10, when this message has been received once again, then it would be found that the values of the corresponding positions have already been flagged as 2. This indicates that this message has been flagged as a retransmitted messages thus, as shown by the rightmost table in FIG. 10, this message is not required to be further processed any more.

From the above description, the flagged values in the message filter can indicate how many times the received message is transmitted or retransmitted, for example, a flagged value of 0 indicates that this message is transmitted for the first time; a flagged value of 1 indicates that this message is retransmitted for the first time; and a flagged value of 2 indicates that this message has already been retransmitted more than one time.

Since the size of the message filter is fixed, all the values in the message filter will be decreased periodically to prevent from being overloaded.

In addition, considering that the process of the message filter should be rapid and efficient in the case where the memory space is limited, therefore, a countable Bloom filter 1100 (which is abbreviated as sender filter hereinafter) as shown in FIG. 11 is employed to implement the message classifier 803 shown in FIG. 8. Based on the concept of the standard Bloom filter, the bit array in the standard Bloom filter is extended to a 4-bit counter array, in which each counter can have 16 possible values so at to classify the messages, i.e., to determine it said message is tend to be retransmitted and to identify if an user is tend to retransmit messages. Each unit as shown in FIG. 11 represents a counter.

When a message is received, the sender filter 1100 hashes the sender ID using the HFG, and the sender ID may be the From URI in the header of the message, or other fields identifying the sender which can be acquired from the message. When a retransmitted message is detected, values obtained by hashing the send ID will correspond to the same unit positions as shown in FIG. 11, ad then the counters in these unit positions are increased by 1. FIG. 11, shows the counter values of Sender 1 (RU=1) and Sender 2 (RU=2), in which the counter values of Sender 1 are 1, 2, 1, 1, while the counter values of Sender 2 are 3, 4, 5, 4. Since the hash values obtained by hashing different sender IDs possibly correspond to the same unit position (s), thereby cause overlapping, the respective counter values of a certain sender RD may be different from each other. Therefore, the minimum value (represented by CW) of all the counter values indicated by the hash values of a certain sender ID is regarded as the retransmission indicator value of this sender. For example, as shown in FIG. 11, the retransmission indicator value of Sender 1 is 1.

Thus it can be seen that, the flagged senders who are tend to retransmit messages can be kept by the sender filter 1100, and can be configured by the retransmission detector (i.e., the message filter).

When a message is received, it is checked whether the value of the retransmission indicator of the message sender is larger than a predetermined threshold T or not. If so, then this message will be considered as tend to be retransmitted, and then will be sent to the retransmission rejection device 804 shown in FIG. 8. If the value of the retransmission indicator of the message sender is less than said predetermined threshold T, then this message will be sent out directly.

Said threshold T can be determined and adjusted according to the distribution of the values in the sender filter (i.e., the distribution of the value of the retransmission indicator of the sender) and the size of the available memory space.

According to one preferred embodiment of the present invention, said predetermined threshold T can be determined as follows. Suppose that the retransmission processing rate of the retransmission rejection device 804 is λa transaction per second (TPS) (which can be determined by the size of the available memory space in the SIP stateless proxy), and T is the minimum integer making the total sum of the message arrival rates of all the messages with CW≥T less than λa.

Since the size of the sender filter is fixed, similar to the message filter 1000, all the values in the sender filter 1100 are also required to be decreased periodically in order to prevent from being overloaded. For example, when more than one half of the counters in the sender filter reach the maximum value, all the counter values are decreased by a certain value (for example, 1 or the minimum value of all counter) unless the values thereof are already zero, when the counter values are decreased, the distribution of the counter values can be calculated, and said threshold T for determining whether a message from a certain sender is tend to be retransmitted within the next period of time can also be calculated according to the size of the available memory space.

A transaction table 1200 used in this embodiment will be described by referring to FIG. 12 below.

As shown in FIG. 12, this transaction table is implemented by a two-level structure which comprises two sub-tables: a circular transaction item table and an index table.

The circular transaction item table is used to store and keep transaction items, and has a pointer pointing to the next empty position. When a new transaction item is to be inserted into the transaction table, this new item will be placed in the position pointed to by the pointer (just as described above, the address pointer of the real storage position or memory location of this transaction item is placed in said position). Then, the pointer will be increased by one. The circular transaction item table is a compact table where the items are placed one by next, the size of which can be calculated as follows:

$$N=M/S,$$

where, M represents the size of the available memory space, and S represents the average size of the transaction items.

The index table is used to keep the positions of the transaction items in the circular transaction item table, in which each index is just an integer. Therefore, in the case where the memory space in the SIP stateless proxy is very small, the size of the index table might be large. In fact, the size of the index table n is required to be larger than the size of the circular transaction item table N. In a preferred embodiment, n/M=5. Even if n/M=10, the occupied memory space by the index table is less than 1% of that occupied by the circular transaction item table.

In order to insert or find transaction items in the transaction table rapidly, the index table is implemented as a hash table, and a plurality of hash functions are utilized for collision avoidance and fast finding. Assume that the size of the index table is n (i.e., the index table is an array with the size n) and k hash functions $H_1, H_2, \ldots, H_k$ are selected. The transaction ID x serves as the keyword of the transaction item and $H_1, H_2, \ldots H_k$ map x into an integer within the interval (0, 1, ..., n−1).

If a new transaction item will be inserted into the transaction table, then the transaction item is directly placed in the circular transaction item table, and the position where the transaction item is placed in the circular transaction item table is the index of the transaction item in the index table. Then, it is determined whether the $H_i(x)^{th}$ (1≤i≤k) position in the index table is empty or not in sequence, once one of the positions is found to be empty, then said index value is placed in this position in the index table. If none of the positions indicated by $H_i(x)$ (1≤i≤k) are found to be empty, then it is checked whether the item pointed by the old index value stored in the $H_i(x)^{th}$ (1≤i≤k) position in the index table has been expired or not in sequence, and if the item has been expired, then the new index is placed in this position. If none of the items pointed to by the old indexes stored in all the positions of $H_i(x)$ (1≤i≤k) in the index table has been expired, then the index value of the oldest transaction item is replaced by this new one.

If it is required to find a transaction item with the transaction ID (TID) x (which is abbreviated as target transaction item), then for each $H_i(x)$ (1≤i≤k), the TID of the transaction item in the circular transaction item table which is pointed to by the index value (represented by Index ($H_i(x)$)) stored in the $H_i(x)^{th}$ (1≤i≤k) position in the index table is compared in sequence. If the target transaction item is found in a certain position in the circular transaction item table which is pointed to by a certain index value Index($H_i(x)$), the finding process terminates. If the target transaction item fails to be found in all the positions of the circular transaction item table which are pointed by all the index values Index($H_i(x)$), the finding process will return null.

For example, suppose that a certain transaction item is placed in the 200th position. The index value of the transaction item is 200. The TID of the transaction item is hashed with $H_i(x)$ (1≤i≤k) in sequence. If an empty or expired position has been found in the position pointed to by $H_i(x)$ (1≤i≤k) in the index table, then the index value of 200 is placed in this position. Otherwise, the index value of 200 is placed in the position with the oldest index value. In addition, in order to find this transaction item, just reverse the above process. By hashing the TID with $H_i(x)$ (1≤i≤k) one by one, the TID of the transaction item indicated by the index value in the $H_i(x)^{th}$ (1≤i≤k) position in the index table is checked in sequence until the desired transaction item is found.

As described above in connection with FIG. 7, in order to accelerate the manipulation of the hash table. $H_1, H_2, \ldots, H_k$ should be selected properly. For example, since the transaction ID is a character string, $H_2$ can be selected as a hash function for characters, and all the subsequent $H_2, \ldots, H_k$ can be selected as hash functions for performing bit manipulation of the result of $H_1(x)$.

It can be seen from the description of the preferred embodiments of the present invention that, with the present invention, while the throughput of the SIP calls is maintained or increased, the workload of the SIP application server can be decreased, better quality of service (QoS) can be achieved and operation costs can be reduced.

The preferred embodiments of the present invention have been described above with reference to FIGS. 3 to 12, however, it would be appreciated that the above exemplary description is not exhaustive and other different preferred embodiments of the present invention are possible depending on design requirements.

For example, although it has been described in one embodiment of the present invention that the retransmission detector 802, message classifier 803 and transaction table 805 as shown in FIG. 8 are improved at the same time, it is possible to improve them respectively or improve some of them in any combination manner. Moreover, for the retransmission detector and message classifier, other implementations besides the Bloom filter can be used as long as the predetermined function thereof can be fulfilled.

In addition, as for the transaction tables 705 and 805 as shown in FIGS. 7 and 8, although one preferred embodiment thereof has been described above respectively, it is obvious that the above two structures of the transaction tables can be exchanged and used interchangeably. Furthermore, although the hash table is used to implement the transaction table in both of the above preferred embodiments, it is obvious that other modes can be used to implement the transaction table as long as the structure thereof facilitates rapid insertion, finding, update and deletion of the transaction items.

Moreover, in the present invention, it should also be noted that the message parsing procedure in the SIP stateless proxy and the process of the method described above is different from that in the SIP UA. In the present invention, the message parsing procedure only needs to partially parse received SIP messages, that is, only needs to determine the type, source and destination addresses of messages, and address of the last hop so as to calculate the transaction IDs. Therefore, a partial parser may be used in the present invention so that the parsing efficiency can be improved and the parsing overhead can be reduced. Furthermore, in the method and SIP stateless proxy according to the present invention, if other SIP operations have been executed and the message type and message source have been acquired at the front end of the SIP stateless proxy, then the message parsing result in the SIP operations previously executed can be utilized in the SIP stateless proxy. In this case, the steps related to the message parsing procedure can be omitted in the processing flows of the methods as shown FIGS. 4 and 9. Therefore, the overhead of parsing messages in the SIP stateless proxy can be further reduced.

In addition, although the application of the present invention in the SIP stateless proxy has been described in the typical SIP application architecture as shown in FIG. 1, it is obvious that, besides the application in the SIP stateless proxy, the principle of the present invention can also be applied to other network device such as routers, boundary servers and so on which are located at the front end of the SIP application server and between the SIP terminal and the SIP application server.

Furthermore, it is obvious that each operation procedure of the methods according to the present invention described above can also be implemented in the form of a computer executable program stored in various machine readable storage media.

Moreover, the objects of the present invention can also be implemented by providing a storage medium with codes of the above executable program stored thereon directly or indirectly to a system or device, and then reading out and executing the program codes by a computer or center processing unit (CPU) of the system or device.

At this time, as long as the system or device has the function of executing the program, the implementing modes of the present invention are not limited to the program, and the program can be in any form of, for example, an object program, program executed by an interpreter, or script program provided to an operating system etc.

The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a client computer by connecting to corresponding websites on the Internet, downloading the computer program codes according to the present invention and installing the same into the computer and then executing the program.

Finally, it is also noted that, in this document, relational terms such as left and right, first and second, or the like are used merely to distinguish one entity or action from another entity or action without necessarily requiring or implying any actual such relationship or order between such entities or actions. Moreover, the terms "comprise", "comprising," "include" or any other variations thereof, are intended to cover a non-exclusive inclusion so that a process, method, article, or device that comprises list of elements does not only include these elements but also may include other elements not explicitly listed or inherent to such process, method, article, or device. An element preceded by "a" or "an" does not, without more constraints, preclude the existence of additional identical elements in the process, method, article, or device that comprises the element.

Although the embodiments of the present invention have been described in detail with reference to the accompanying drawings, these embodiments are only used to illustrate the present invention but not to limit the present invention. Various modifications and changes can be made by those skilled in the art without departing from the spirit and scope of the present invention. Therefore, the scope of the present invention is only defined by the appended claims and the equivalents thereof.

What is claimed is:

1. A method for rejecting received SIP (Session Initiation Protocol) messages which are redundantly retransmitted in a SIP application architecture, wherein the message type and transmission direction of said SIP messages are known, said method comprising the steps of;
    (a) forwarding all the messages transmitted from a SIP application server to a SIP terminal according to the transmission direction of said SIP messages;
    (b) determining whether the received SIP messages transmitted from the SIP terminal to the SIP application server are redundantly retransmitted based on the transmission direction of said SIP messages, dropping all the received SIP messages redundantly retransmitted from the SIP terminal to the SIP application server, and responding to the dropped SIP messages according to the message type thereof, if said received message transmitted from the SIP terminal to the SIP application server is redundantly retransmitted, then dropping said redundantly retransmitted message;
    performing transaction query on a received SIP message to find whether a transaction item containing transaction information corresponding to the received SIP message in a transaction table exists,
    wherein said transaction information includes transaction ID, message arrival time and a corresponding response related to the SIP message.

2. The method of claim 1, further comprising:
    inserting a new transaction item into the transaction table to record the transaction information corresponding to said received message, if said transaction item has not been found in the transaction table and the received SIP message is a request.

3. The method of claim 1, wherein said step (a) further comprises;
    when said transaction item is found in said transaction table, and the SIP message transmitted from the SIP application server to the SIP terminal is the first transmission of a response or ACK, recording this message in the transaction item of the transaction table.

4. The method of claim 1, wherein said step (b) further comprises:
    if said received SIP message transmitted from the SIP terminal to the SIP application server is not redundantly retransmitted, then recording said message in the transaction item of the transaction table, and forwarding this message.

5. The method of claim 1, wherein the step (b) further comprises:
    when said dropped SIP message is a request:
    determining whether a response corresponding to the request exists in the transaction item of the transaction table,
    if the corresponding response exists, then replying to the request with said corresponding response, and
    if the corresponding response does not exist, then dropping said message, when said dropped message is a final response to a INVITE transaction:
  determining whether a corresponding ACK has been received,
  if said ACK has been received, then replying with said ACK, and
  if said ACK has not been received, then waiting until said ACK has been received and repeating sending said ACK a predetermined number of times.

6. The method of claim 1, wherein said transaction table is one of a hash table, a two-level transaction table including a circular transaction item table and a hash table.

7. The method of claim 1, wherein said method is executed in a network device located between the SIP terminal and the SIP application server and at the front end of the SIP application server.

8. The method of claim 7, wherein said network device is a SIP stateless proxy.

9. The method of claim 1, wherein the message type and transmission direction of said SIP message can be obtained by partially parsing said received message.

10. A retransmission rejection device for rejecting received SIP messages which are redundantly retransmitted in a SIP application architecture, wherein the message type and transmission direction of said SIP messages are known, said device comprising:
  a retransmission identifier for determining whether received SIP messages transmitted from a SIP terminal to a SIP application server are redundant retransmission;
  a message processor for forwarding all the received messages transmitted from the SIP application server to the SIP terminal, dropping all the received SIP messages redundantly retransmitted from the SIP terminal to the SIP application server, and responding to the dropped SIP messages according to the message type thereof, wherein if said received message transmitted from the SIP terminal to the SIP application server is redundantly retransmitted, then dropping said redundantly retransmitted message; and
  a transaction query and generation unit for performing transaction query on the received SIP message to find a transaction item containing transaction information corresponding to the received SIP message in a transaction table,
  wherein said transaction information includes transaction ID, message arrival time, a corresponding response related to said SIP message.

11. The retransmission rejection device of claim 10, wherein,
  if the corresponding transaction information does not exist in the transaction table, and the SIP message is a request, then said transaction query and generation unit create a new transaction item in the transaction table to record the transaction information corresponding to said message.

12. The retransmission rejection device of claim 10, wherein,
  when said transaction item is found in said transaction table, and the SIP message transmitted from the SIP application server to the SIP terminal is the first transmission of a response or ACK, said message processor records this message in the transaction item of the transaction table.

13. The retransmission rejection device of claim 10, wherein,
  if said received SIP message transmitted from the SIP terminal to the SIP application server is not redundantly retransmitted, then said message processor records said message in the transaction item of the transaction table, and forwards the message.

14. The retransmission rejection device of claim 10, wherein said message processor further executes the following functions;
  when said dropped SIP message is a request:
  determining whether a response corresponding to the request exists in the transaction item of the transaction table,
  if the corresponding response exists, then directly replying to the request with said corresponding response,
  if the corresponding response does not exists, then directly dropping this message, and
  when said dropped message is a final response to a INVITE transaction:
  determining if a corresponding ACK has been received,
  if said ACK has been received, then replying with said ACK, and
  if said ACK has not been received, then waiting until said ACK has been received, and repeating sending said ACK a predetermined number of times.

15. There transmission rejection device of claim 10 is included in a network device located between the SIP terminal and SIP application server and at the front end of the SIP application server.

16. The retransmission rejection device of claim 15, wherein said network device is one of a SIP stateless proxy, router, and boundary server.

17. The retransmission rejection device of claim 10, wherein the message type and transmission direction of said SIP message can be obtained by partially parsing said received message.

18. A network device for rejecting redundant retransmission of received SIP messages used in a SIP application architecture, which is located between a SIP terminal and a SIP application server and at the front end of the SIP application server, the network device comprising:
  a transaction table including transaction items with transaction information of said SIP messages stored thereon; and
  a retransmission rejection device for rejecting received SIP messages which are redundantly retransmitted in a SIP application architecture, wherein the message type and transmission direction of said SIP messages are known, said device comprising:
  a retransmission identifier for determining whether received SIP messages transmitted from the SIP terminal to the SIP application server are redundant retransmission, and
  a message processor for forwarding all the received messages transmitted from the SIP application server to the SIP terminal, dropping all the received SIP messages redundantly retransmitted from the SIP terminal to the SIP application server, and responding to the dropped SIP messages according to the message type thereof, wherein if said received message transmitted from the SIP terminal to the SIP application server is redundantly retransmitted, then dropping said redundantly retransmitted message; and
  a transaction query and generation unit for performing transaction query on the received SIP message to find a transaction item containing transaction information corresponding to the received SIP message in a transaction table, wherein said transaction information includes transaction ID, message arrival time, a corresponding response related to said SIP message.

\* \* \* \* \*